(12) United States Patent
Abe (10) Patent No.: US 7,787,762 B2
(45) Date of Patent: Aug. 31, 2010

(54) IMAGE PHOTOGRAPHING APPARATUS, IMAGE PHOTOGRAPHING METHOD, AND COMPUTER PROGRAM

(75) Inventor: Hiroshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 12/107,314

(22) Filed: Apr. 22, 2008

(65) Prior Publication Data

US 2008/0317455 A1      Dec. 25, 2008

(30) Foreign Application Priority Data

Jun. 25, 2007     (JP)     ............................. 2007-166994

(51) Int. Cl.
*G03B 17/00* (2006.01)
*H04N 5/228* (2006.01)
(52) U.S. Cl. .................................... 396/263; 348/222.1
(58) Field of Classification Search .................. 396/263; 348/222.1
See application file for complete search history.

(56) References Cited

U.S. PATENT DOCUMENTS

| 2002/0149681 | A1* | 10/2002 | Kahn et al. | ............. | 348/211.99 |
| 2004/0218916 | A1* | 11/2004 | Yamaguchi et al. | ......... | 396/263 |
| 2007/0025722 | A1* | 2/2007 | Matsugu et al. | ............. | 396/263 |
| 2008/0292299 | A1* | 11/2008 | Kretz et al. | ................. | 396/263 |
| 2008/0309796 | A1* | 12/2008 | Abe | ....................... | 348/231.99 |
| 2009/0002512 | A1* | 1/2009 | Suzuki et al. | ............. | 348/222.1 |
| 2009/0190803 | A1* | 7/2009 | Neghina et al. | ............. | 382/118 |

FOREIGN PATENT DOCUMENTS

| JP | 9-171560 | 6/1997 |
| JP | 2000-347278 | 12/2000 |
| JP | 2003-271933 | 9/2003 |
| JP | 2004-294498 | 10/2004 |
| JP | 2006-237803 | 9/2006 |
| JP | 2007-81471 | 3/2007 |

* cited by examiner

*Primary Examiner*—Rodney E Fuller
(74) *Attorney, Agent, or Firm*—Oblon, Spivak, McClelland, Maier & Neustadt, L.L.P.

(57) ABSTRACT

An image photographing apparatus for capturing a subject image in accordance with smile detection of a subject includes an optical unit; an image capturing unit configured to capture the subject image; an optical mechanism driving control unit configured to control driving of mechanisms of the optical unit; an image signal processing unit configured to perform signal processing on the captured image; an image recording unit configured to record the captured image onto a predetermined recording medium; a face detection unit configured to detect a face of the subject; a smile detection unit configured to detect a smile on the detected face; and a smile-detection photography control unit configured to perform photographing processing for the subject image in response to detection of the smile of the subject from the captured image, while the driving of the mechanisms by the optical mechanism driving control unit is maintained fixed.

17 Claims, 10 Drawing Sheets

IMAGE PHOTOGRAPHING APPARATUS, IMAGE PHOTOGRAPHING METHOD, AND COMPUTER PROGRAM

CROSS REFERENCES TO RELATED APPLICATIONS

The present invention contains subject matter related to Japanese Patent Application JP 2007-166994 filed in the Japanese Patent Office on Jun. 25, 2007, the entire contents of which are incorporated herein by reference.

BACKGROUND OF THE INVENTION

1. Field of the Invention

The present invention relates to image photographing apparatuses, image photographing methods, and computer programs for capturing images containing subjects, such as human beings, and more particularly, to an image photographing apparatus, an image photographing method, and a computer program for performing, in response to recognition of a particular pattern of a subject contained in an image, automatic processing relating to camerawork.

More specifically, the present invention relates to image photographing apparatuses, image photographing methods, and computer programs for automatically determining a photographing timing by utilizing recognition of a smile of a subject contained in an image, and more particularly, to an image photographing apparatus, an image photographing method, and a computer program for, in the case that an input image contains a plurality of subjects, focusing on an appropriate subject, performing smile detection on the subject, and automatically determining a photographing timing.

2. Description of the Related Art

Cameras have a long history as devices for recording visual information. Recently, instead of silver-salt cameras for performing photography using films and sensitive plates, digital cameras for digitizing images captured using solid-state image capturing elements, such as charge-coupled devices (CCDs) or complementary metal-oxide semiconductors (CMOSs), have been widely used. Digital cameras have advantages of being capable of storing digitized and encoded images in a memory, performing image processing and image control using a computer, and not having a problem relating to the lifetime of films.

Almost the same basic camerawork is adopted for silver salt cameras and digital cameras. Together with the digitization of captured images, automation technology for camerawork has been developed. Thus, even users who are inexperienced at performing camera operations are significantly less likely to perform unsuccessful photography. The automation technology for camerawork includes, for example, an auto-focus (AF) function, an auto-exposure (AE) function, and motion blur correction. Digital cameras have an advantage of being capable of implementing processing, such as AF and AE, not only by using an optical system but also by digital processing. In addition, in a case where image-quality adjustment is performed on a captured image by digital processing, such as application of white balance gain to a captured image using auto white balance (AWB), colors can be reproduced accurately.

With functions such as auto-focus and image-quality correction, processing is to be performed with reference to any one of one or more subjects existing in an image frame. Formerly, users set important subjects by manual operations. Recently, however, image capturing technology utilizing face detection for detecting a face from a captured image and automatically focusing on the detected face or automatically correcting image quality with reference to the detected face has been introduced.

As a technique for detecting a face from a captured image signal, for example, a technique for performing matching between an input image signal and an average face image used as a template has been widely available in the technical field to which the present invention pertains (see, for example, Japanese Unexamined Patent Application Publication No. 2003-271933 (paragraphs 0051 to 0053 and FIG. 6)). In a case where a face in a captured image is tilted, it is difficult to achieve accurate face detection. Thus, a technique for detecting the angle of tilt of a face, rotating the face image in accordance with the detected value, and then performing matching processing has been available. As a method for detecting the angle of tilt of a face, for example, a technique for detecting candidate center lines of the face, calculating a degree indicating the plausibility of each of the candidate center lines being the actual center line of the face on the basis of the bilateral symmetry of the face, and outputting the angle of the center line having the highest plausibility as the angle of tilt of the face has been available (see, for example, Japanese Unexamined Patent Application Publication No. 9-171560 (paragraphs 0032 to 0044 and FIG. 4)).

In addition, recently, research and development relating to automatic photography for determining a photographing timing by utilizing recognition of a particular pattern, such as a smile, from an image of a subject has been conducted.

For example, a camera that determines whether a target portion of a main subject to be photographed meets a predetermined photographing condition and that outputs a photographing timing signal at a time when the target portion of the main subject meets the photographing condition has been suggested (see, for example, Japanese Unexamined Patent Application Publication Nos. 2000-347278, 2004-294498, and 2006-237803). The term "target portion" represents, for example, in the case of photographing a human being, the shapes and colors of the eyes and the mouth of the human being, and in the case of photographing a bird, the feathers of the bird.

As specific criteria for determining a photographing timing, conditions under which an image of a human being can be captured finely, such as "not blinking", "looking in the direction of a camera", "smiling", and the like may be regarded as being criteria for determining an appropriate photographing timing. In addition, technology for improving a photograph of a human being as a subject has been available. However, it is difficult to modify a photograph of a person who is blinking such that the person is not blinking or to modify a photograph of a person who is not laughing such that the person is laughing. This is one of the reasons why "smiling" is set as a photographing condition. For example, the photographing condition "smiling" can be determined on the basis of image information, such as the areas of white portions of the eyes of a subject, the lateral length of the mouth of the subject, and the area of a white portion in the mouth.

In the case of performing photography, it is necessary to adjust the focus and the iris to be suitable for a subject. As described above, with the automatic photography function for recognizing a particular pattern, such as a smile, of a subject and performing a photographing operation, after a smile is detected, an operation for causing the focus and the iris to follow the subject is performed and the photographing operation is then performed. That is, after the smile is detected, a period of time is necessary, the period of time being the same as that in the case of taking a single picture using a normal auto-focus function.

At least a time from about 0.2 seconds to about 0.3 seconds is necessary for the operation for causing the focus and the iris to follow the subject, whereas, in general, a human smile may last only about 0.1 seconds. Thus, even if a smile can be detected from a subject image, an actually captured image often does not contain the smile.

SUMMARY OF THE INVENTION

It is desirable to provide an image photographing apparatus, an image photographing method, and a computer program capable of performing, in response to recognition of a particular pattern of a subject contained in an image, automatic processing relating to camerawork.

It is also desirable to provide an image photographing apparatus, an image photographing method, and a computer program capable of automatically determining an appropriate photographing timing by utilizing recognition of a smile of a subject contained in an image.

It is also desirable to provide an image photographing apparatus, an image photographing method, and a computer program capable of automatically determining a photographing timing in accordance with smile detection and reliably capturing a smile of a subject detected from an image.

It is also desirable to provide an image photographing apparatus, an image photographing method, and a computer program capable of performing a photographing operation without being late for a photographing timing that is automatically determined in accordance with smile detection.

According to an embodiment of the present invention, an image photographing apparatus for capturing a subject image in accordance with smile detection of a subject includes optical means for converging light from the subject; image capturing means for capturing the subject image obtained on the basis of the light from the subject converged by the optical means; optical mechanism driving control means for controlling driving of mechanisms of the optical means; image signal processing means for performing signal processing on the image captured by the image capturing means; image recording means for recording onto a predetermined recording medium the captured image on which the signal processing has been performed by the image signal processing means; face detection means for detecting a face of the subject from the captured image on which the signal processing has been performed by the image signal processing means; smile detection means for detecting a smile on the face detected by the face detection means; and smile-detection photography control means for performing photographing processing for the subject image in response to detection of the smile of the subject from the captured image, while the driving of the mechanisms of the optical means by the optical mechanism driving control means is maintained fixed.

The image photographing apparatus according to the embodiment of the present invention detects a smile level of a detected face serving as a target for smile detection, and controls photographing processing in response to the detected smile level reaching a smile detection level. However, obviously, processing different from photographing may be performed in accordance with a smile detection result.

Recently, image photographing apparatuses, such as digital cameras, have been widely used. Together with this, automation technology relating to various types of camerawork has been developed. Concerning automatic photography, research and development of an auto-shutter function for determining a photographing timing by utilizing recognition of a particular pattern, such as a smile, of an image of a subject has been conducted. As specific criteria for determining a photographing timing, conditions under which an image of a human being can be captured finely, such as "not blinking", "looking in the direction of a camera", "smiling", and the like may be regarded as being criteria for determining an appropriate photographing timing.

In the case of performing photography, it is necessary to perform control for adjusting a focus such that a subject image is converged by an optical system and formed on an image capturing surface of an image capturing element and control for adjusting an iris such that exposure suitable for the subject is performed. However, in a case where after a smile is detected, a scanning operation for causing the focus and the iris to follow the subject is performed and a capturing operation for an image is then performed, a photographing operation does not start within a period of time during which a smile of the subject lasts. Thus, an actually captured image does not contain the smile.

Under such circumstances, in the image photographing apparatus according to the embodiment of the present invention, after a smile is detected from a captured image, a capturing operation is immediately performed, without performing a follow-up operation for fixing the focus and the iris. Thus, the smile of the subject can be captured without fail.

The image photographing apparatus according to the embodiment of the present invention has, for example, a photography mode called a smile-detection photography mode, as well as a normal photography mode. When a user (photographer) performs a shutter key operation, processing corresponding to the currently set photography mode is performed.

In the normal photography mode, focus and iris control (that is, a scanning operation) for a subject in an image is performed in response to a half-press of a shutter key, and camera photography processing (that is, an image capturing operation) is performed in response to a full-press of the shutter key. In the case that a full-press operation of the shutter key is directly performed without performing a half-press operation, a scanning operation similar to an operation to be performed when the half-press operation is performed is performed and then a capturing operation is performed.

In contrast, in the smile-detection photography mode, in response to a half-press of the shutter key, a scanning operation for focus adjustment and iris control for a subject is performed, and the focus and the iris are fixed. Then, in response to a full-press of the shutter key, smile-detection processing for the subject in an image is started. When a smile is detected, a capturing operation for recording the image is directly performed without performing a scanning operation. That is, since the focus and the iris are fixed in advance, a time from about 0.2 seconds to about 0.3 seconds, which is necessary for a scanning operation to be performed between smile detection and a capturing operation, can be eliminated. Thus, the smile of the subject can be captured without fail.

In the smile-detection photography mode, the focus and the iris are basically maintained fixed. Thus, every time a smile of the subject is detected, a capturing operation is performed. In addition, when the shutter key is fully pressed again in the smile-detection photography mode, the smile-detection photography mode is switched to the normal photography mode.

However, the automatic photography method described above is assumed to be performed in a state where a subject stands still. In a case where a subject may move, the subject may be captured in a position that is different from a position fixed in advance. Thus, focus adjustment for a captured image may not be performed accurately. For example, in a case where a detected face disappears due to movement of the subject or a smile of the subject is not detected for a long time, that is, in a case where smile-detection photographing is not performed quickly, it is supposed that the fixed focus and iris are not effective any more.

Thus, in the image photographing apparatus according to the embodiment of the present invention, in the case that smile-detection photographing is not immediately performed after the shutter key is fully pressed, the focus and the iris may be refreshed, that is, a rescanning operation may be performed in an appropriate manner.

More specifically, in the smile-detection photography state, in the case that a detected face serving as a target for smile detection disappears from a captured image, when the subject is detected again, a rescanning operation is started and the focus and the iris are fixed again.

Alternatively, in the smile-detection photography state, in the case that a smile on a detected face serving as a target for smile detection is not detected from a captured image for a predetermined period of time or more, a rescanning operation is started and the focus and the iris are fixed again.

According to another embodiment of the present invention, a computer program written in a computer readable form such that image photographing processing for capturing a subject image is to be executed on a computer causes the computer to execute processing in a smile-detection photography state where the subject image is captured in accordance with smile detection of a subject, the processing including performing control for adjusting a focus such that the subject image is converged by an optical system and formed on an image capturing surface and control for adjusting an iris such that exposure appropriate for the subject is performed; fixing the control for the focus and the control for the iris; detecting a face of the subject from a captured image; and performing, in response to detection of a smile of the subject from the captured image, a capturing operation for recording the captured image onto a predetermined recording medium while the control for the focus and the control for the iris are maintained fixed.

The computer program according to the embodiment of the present invention is a computer program written in a computer readable form such that predetermined processing is to be executed on a computer. In other words, by installing the computer program according to the embodiment of the present invention into the computer, a cooperative operation is implemented on the computer, and advantages similar to those achieved in the image photographing apparatus according to the embodiment of the present invention can be achieved.

As described above, an image photographing apparatus, an image photographing method, and a computer program capable of automatically determining an appropriate photographing timing by utilizing recognition of a smile of a subject contained in an image can be provided.

In addition, an image photographing apparatus, an image photographing method, and a computer program capable of automatically determining a photographing timing in accordance with smile detection and reliably capturing a smile of a subject detected from an image can be provided.

In an image photographing apparatus according to an embodiment of the present invention, after a smile is detected, a capturing operation is immediately started, without performing a follow-up operation for fixing a focus and an iris. Thus, a photographing operation can be performed without being late for a photographing timing automatically determined in accordance with smile detection. Thus, the smile of the subject can be captured without fail.

Further objects, features, and advantages of the present invention will be apparent from the following description of embodiments of the present invention and the attached drawings.

DESCRIPTION OF THE PREFERRED EMBODIMENTS

Embodiments of the present invention will be described with reference to the drawings.

Figure 1:
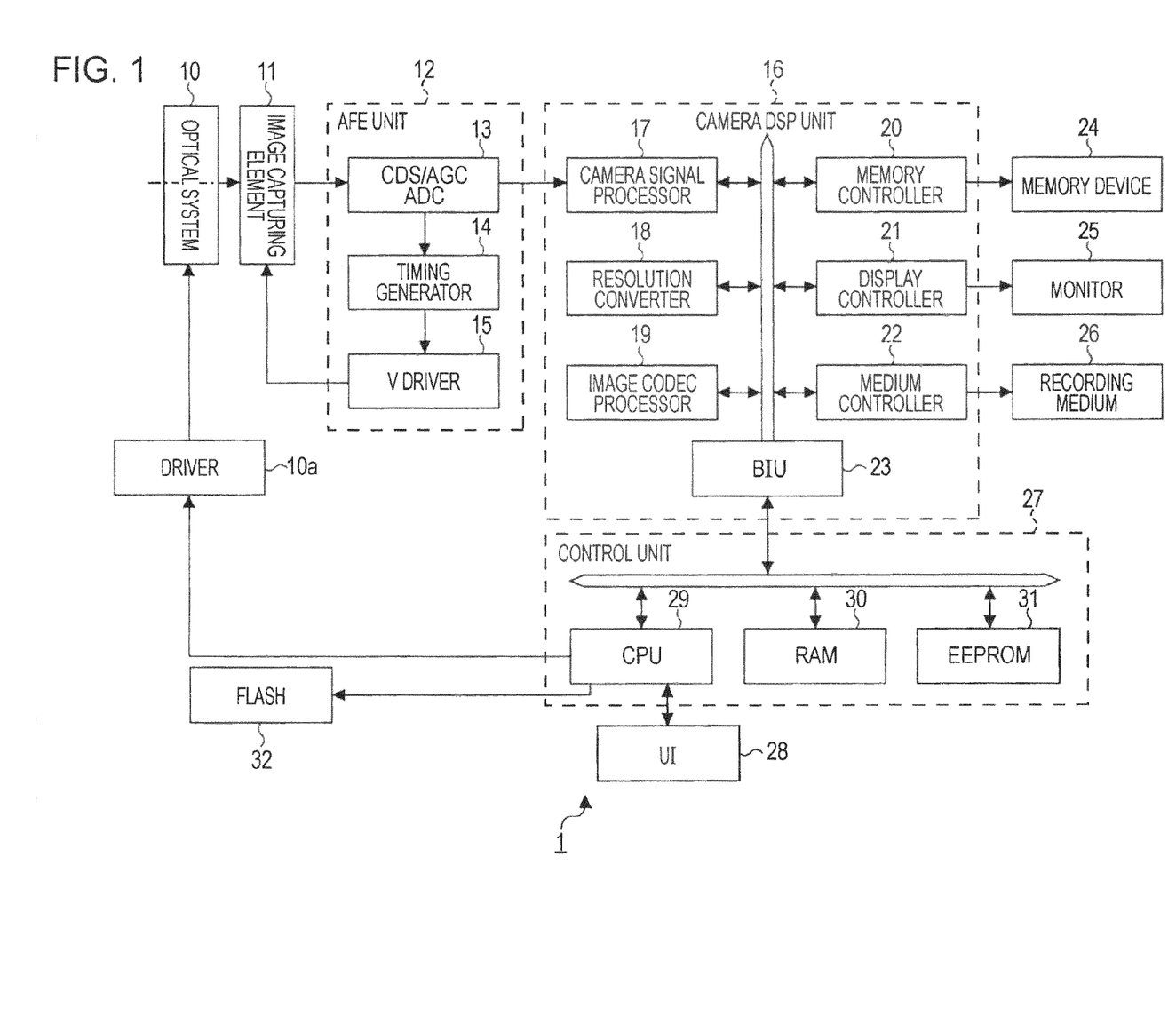
FIG. 1 schematically shows the hardware configuration of a digital still camera to which an embodiment of the present invention can be applied.

FIG. 1 schematically shows the hardware configuration of a digital still camera 1 to which an embodiment of the present invention can be applied. The digital still camera 1 shown in FIG. 1 includes an image capturing element 11, an analog front end (AFE: analog pre-processing) unit 12, and a camera digital signal processor (DSP) unit 16. The digital still camera 1 digitizes images received through an optical system 10 and the digitized images are recorded in the digital still camera 1.

The optical system 10 includes a lens for conversing light from a subject onto an image capturing surface of the image capturing element 11, a driving mechanism for moving a lens to perform focus adjustment and zooming, a shutter mechanism for causing light from a subject to be incident to the image capturing element 11 only for a predetermined period of time by an opening/closing operation, and an iris (diaphragm) mechanism for defining the direction and area of light flux from a subject. Each of the parts constituting the optical system 10 is not illustrated in FIG. 1. A driver 10a controls driving of each of the mechanisms in the optical system 10 (for example, focus and iris control for a subject) on the basis of a control signal from a central processing unit (CPU) 29, which will be described later.

The image capturing element 11 has an image capturing surface on which a plurality of pixels having a photoelectric conversion efficiency, such as a CCD or a CMOS, are two-dimensionally arranged, and converts light incident from a subject into an electric signal. On a light-receiving side, for example, a G-checkered RB-color coding single panel is provided. Signal electric charges corresponding to the amounts of incident light passing through color filters are accumulated in each of the pixels, and the color of incident light in the pixel position can be reproduced from the amounts of signal electric charges of three colors read from the pixel. Analog image signals output from the image capturing element 11 are primary-color signals of RGB colors. However, the analog image signals may be complementary-color signals.

The AFE unit 12 includes a correlated double sampling/automatic gain control/analog-to-digital converter (CDS/AGC/ADC) block 13, a timing generator 14, and a V driver 15. The AFE unit 12 is configured, for example, as a single integrated circuit (IC) chip.

The CDS/AGC/ADC block 13 suppresses a low noise component of a pixel signal received from the image capturing element 11 with high accuracy (that is, performs correlated double sampling). Then, the CDS/AGC/ADC block 13 performs sampling and holding. Then, the CDS/AGC/ADC block 13 performs appropriate gain control using an automatic gain control function, performs analog-to-digital conversion, and outputs an obtained digital image signal.

The timing generator 14 generates a timing pulse signal for driving the image capturing element 11. In accordance with the timing pulse signal, the V driver 15 outputs a driving signal for outputting electric charges of pixels of the image capturing element 11 in a vertical direction in units of lines.

The camera DSP unit 16 includes a camera signal processor 17, a resolution converter 18, an image codec processor 19, a memory controller 20, a display controller 21, and a medium controller 22. The camera DSP unit 16 is configured, for example, as a single IC chip.

The camera signal processor 17 performs pre-processing, such as defect pixel correction, digital clamping, and digital gain control, on an image signal transmitted from the AFE unit 12. Then, the camera signal processor 17 performs application of white balance gain using an automatic white balance (AWB) function and performs image-quality correction processing, such as sharpness adjustment and another contrast adjustment, so that colors can be reproduced accurately. Furthermore, the camera signal processor 17 performs demosaic processing to generate an RGB screen signal (image-quality adjustment can include processing, such as flash light control and red-eye reduction). In addition, the camera signal processor 17 performs γ correction for an RGB image signal to convert the RGB image signal into a grayscale level suitable for the case where image information is output to a monitor, printed, or recorded.

The resolution converter 18 changes the size of an image in accordance with whether an image is to be displayed as a through image on a monitor display 25 or to be captured, that is, stored on a recording medium.

The image codec processor 19 converts image signals of an RGB color system into image signals of a color system of a brightness signal (Y) and color-difference signals (Cr/Cb). Then, the image codec processor 19 performs encoding and compression processing, such as joint picture experts group (JPEG) compression or moving picture experts group (MPEG) compression. Due to such a color space conversion into the YUV color system, by utilizing the visibility characteristics of human beings in that resolution for brightness is high, whereas resolution for color is low, data compression can be easily performed.

The memory controller 20 controls an access operation for writing and reading data, such as captured image information, to and from a memory device 24, such as a synchronous dynamic random-access memory (SDRAM).

The monitor display 25 is, for example, a liquid crystal display (LCD) or a thin display panel of a different type. The display controller 21 controls driving of the monitor display 25. The display controller 21 converts image data (through image) output from the camera signal processor 17 and image data stored in the memory device 24 into signals to be displayed on the monitor display 25, and outputs the obtained signals to the monitor display 25.

Figure 12:
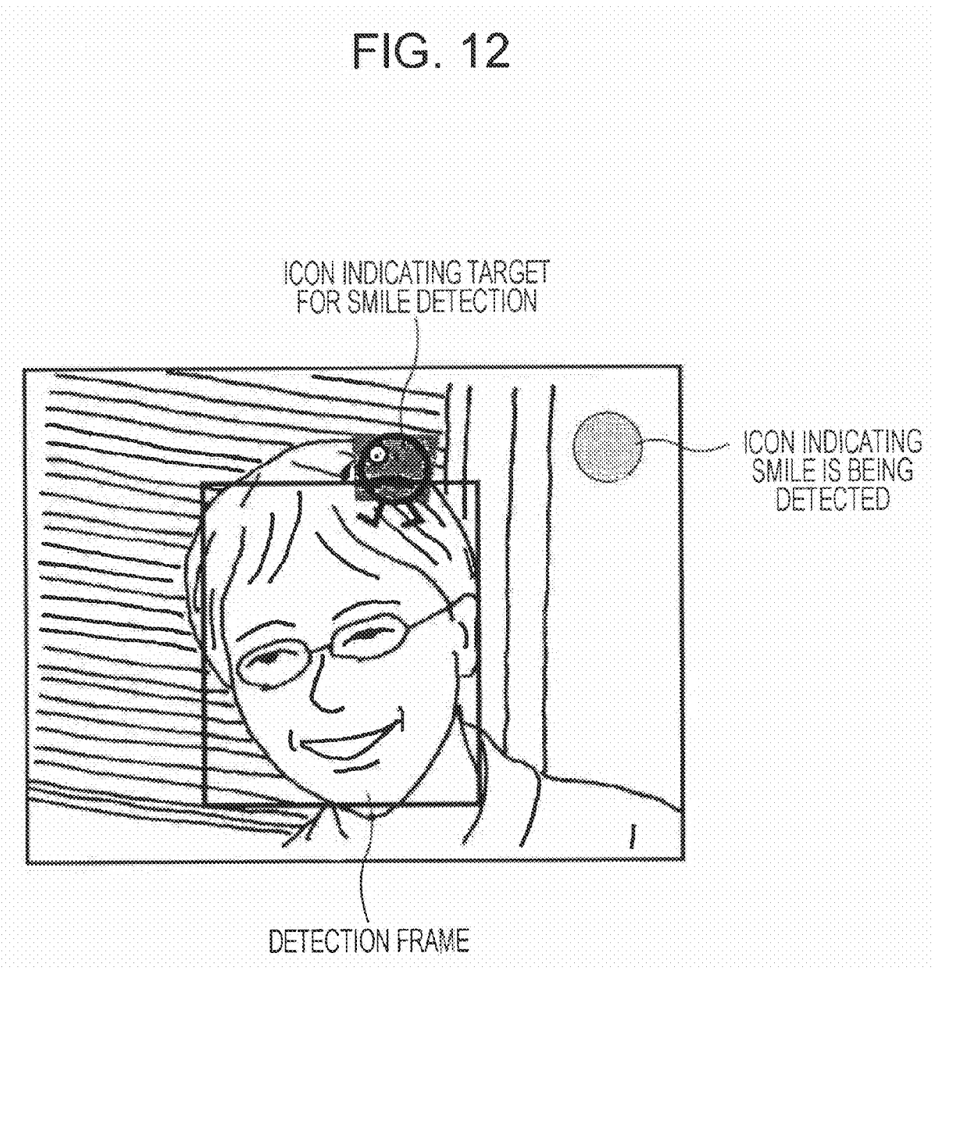
FIG. 12 is an illustration for explaining a through image and on screen display (OSD) display information to be displayed on the monitor display.

Through images are displayed on the monitor display 25. In addition, in response to a request from a control unit 27, which will be described later, a menu screen, various setting screens, various types of warning information, and the like are combined and are displayed as on screen display (OSD). In this embodiment, as a setting screen to be displayed as OSD on the monitor display 25, a detection frame indicating a detected face of a detected subject, an icon for identifying a subject set as a target for smile detection, an icon indicating that a smile is being detected, and the like are included (see FIG. 12).

In addition, a touch sensor is superimposed on the surface of the monitor display 25. The monitor display 25 also serves as a touch panel. Coordinates detected by a touch panel are the same as coordinates displayed on the display panel. Thus, a photographer is able to directly designate, on the display screen of the monitor display 25, a subject serving as a target for smile detection and other graphical user interface (GUI) components.

The medium controller 22 has a slot into which a removable recording medium 26, such as Memory Stick®, is to be inserted. The medium controller 22 writes and reads data to and from the recording medium 26. For example, the medium controller 22 records a captured image file stored in the memory device 24 onto the recording medium 26.

The camera DSP unit 16 is connected to the control unit 27 via a bus interface unit (BIU) 23. The control unit 27 includes a user interface (UI) 28, the CPU 29 that generally controls operations of the entire apparatus in accordance with user operations, a random-access memory (RAM) 30, which serves as a main storage memory for the CPU 29, and an electrically erasable and programmable read only memory (EEPROM) 31 that stores, in a nonvolatile manner, a program code and apparatus information.

The CPU 29 performs smile-detection processing for a subject by using an image (through image) obtained by resolution conversion in the resolution converter 18. The CPU 29 also performs GUI processing to perform OSD display on the monitor display 25. The GUI processing includes processing, such as displaying a detection frame for identifying a subject designated by a photographer as a target for smile detection and displaying the detection frame such that the subject serving as a target for smile detection can be discriminated from a subject not serving as a target for smile detection (see FIG. 12).

The UI 28 has an operation function of allowing a user to issue an instruction and an output function, such as a speaker and a light-emitting diode (LED) lamp. As the operation function, for example, a shutter key button and keys and dials to be used for various types of settings, such as turning on and off of flash light, are provided. Control signals corresponding to user operations relating to the operation function are input to the CPU 29.

In this embodiment, the digital still camera 1 has a plurality of photography modes. An instruction indicated by a shutter key operation is different according to the photography mode. In a normal photography mode, a half-press of the shutter key indicates an instruction for focus and iris control for a subject in an image, and a full-press of the shutter key indicates an instruction for camera photography processing. In contrast, in a smile-detection photography mode, a full-press of the shutter key starts smile detection for a subject, and camera photography processing is started in response to detection of a smile.

In addition, with the output function, the UI 28 is capable of feeding back information relating to camerawork to a user by producing sound such as alarm, lighting or blinking of an LED, or the like. A flash-light emission unit 32 emits flash light in accordance with flash control information received from the control unit 27.

In the digital still camera 1, signals that are received in the image capturing element 11 and are subjected to photoelectric conversion are sequentially supplied to the AFE unit 12. After the signals are subjected to CDS processing and AFE processing, the signals are converted into digital signals. The camera signal processor 17 performs image-quality correction for the digital image signals supplied from the AFE unit 12, and converts the obtained digital image signals into brightness signals (Y) and color-difference signals (R-Y, B-Y). Then, image data output from the camera signal processor 17 is converted into display image signals by the display controller 21, and a through image is displayed on the monitor display 25.

Figure 2:
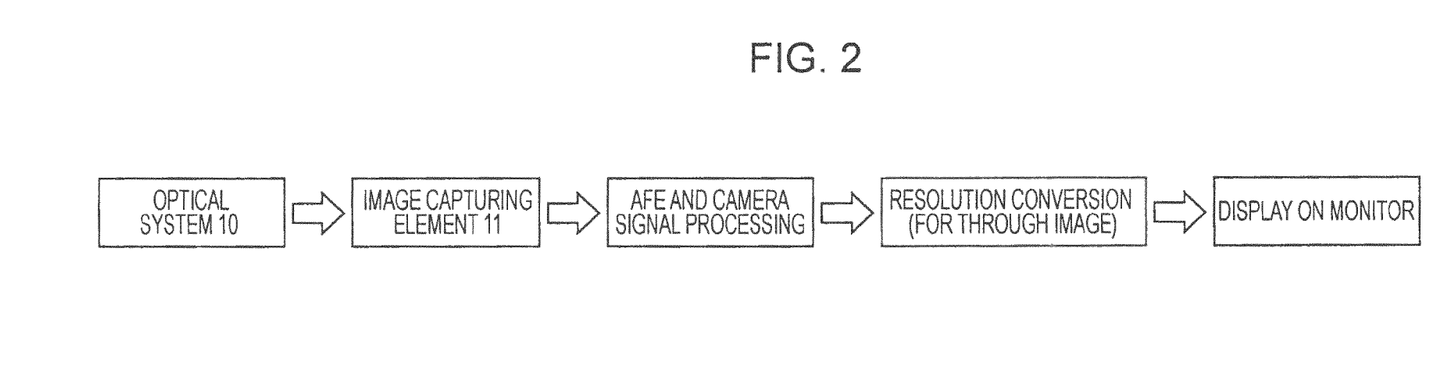
FIG. 2 is a schematic data flow diagram in a case where a camera image is through-displayed on a monitor display.

FIG. 2 is a schematic data flow diagram in a case where a camera image (through image) is displayed on the monitor display 25.

Information on a subject is converted into a digital signal through the optical system 10, the image capturing element 11, and the AFE unit 12, and the obtained digital signal is transmitted to the camera DSP unit 16. The camera DSP unit 16 performs image signal processing for correcting brightness, color, and the like, and converts the resolution of an image so as to be displayed on the panel. The obtained image is displayed on the monitor display 25. Control for such image output processing is attained when the CPU 29 in the control unit 27 executes a specific program code. In reality, control distribution is finely defined. However, since this does not directly relate to the gist of the present invention, the description of such control distribution will be omitted.

Figure 3:
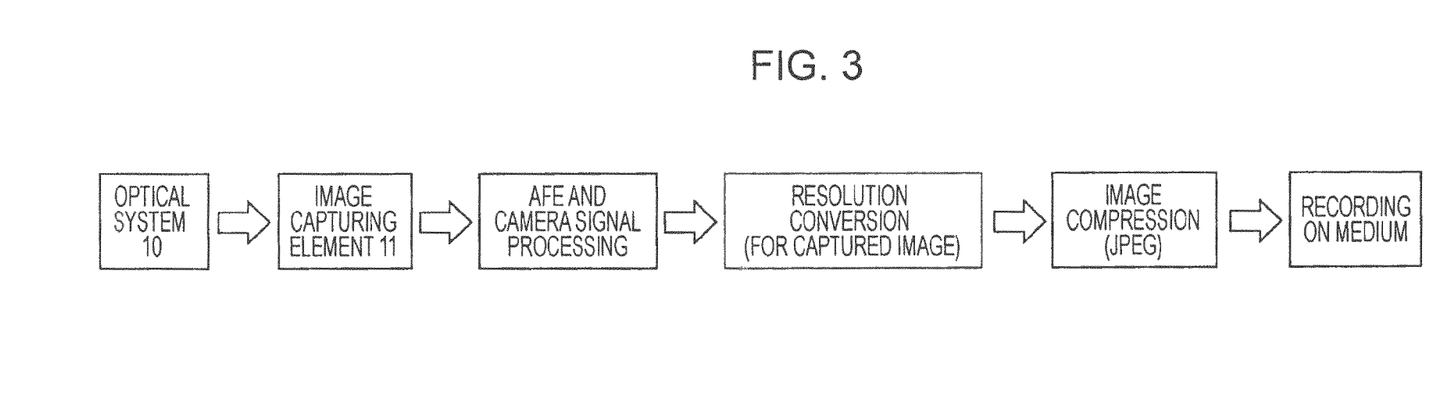
FIG. 3 is a schematic data flow diagram in a case where the digital still camera performs image photographing processing.

FIG. 3 is a schematic data flow diagram in a case where the digital still camera 1 performs image photographing processing.

As in the case of displaying a through image, information on a subject is converted into a digital signal through the optical system 10, the image capturing element 11, and the AFE unit 12, and the obtained digital signal is transmitted to the camera DSP unit 16. The camera DSP unit 16 performs image signal processing for correcting brightness, color, and the like.

When the control unit 27 is instructed to record an image in response to a user operation via the UI 28 or the like, the resolution converter 18 converts the resolution of image data from the camera signal processor 17 so as to have an image size for photographing, and the obtained image data is supplied to the image codec processor 19. The image codec processor 19 performs specific compression and encoding processing on the image data. Then, the obtained image data is stored in the memory device 24 under the control of the memory controller 20 or stored on the recording medium 26 under the control of the medium controller 22.

In the case of recording a still image, image data for one frame is supplied from the camera signal processor 17 to the image codec processor 19. In the case of recording moving images, processed image data is continuously supplied to the image codec processor 19.

In the normal photography mode, focus and iris control (that is, a scanning operation) for a subject in an image is performed in response to a half-press of the shutter key, and camera photography processing (that is, an operation for capturing an image) is performed in response to a full-press of the shutter key.

Figure 4A:
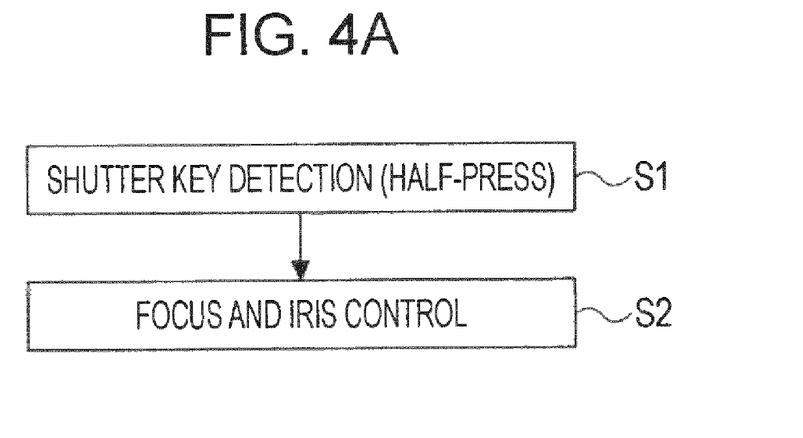
FIG. 4A is a flowchart showing a process of a scanning operation to be performed when the digital still camera captures an image.
Figure 4B:
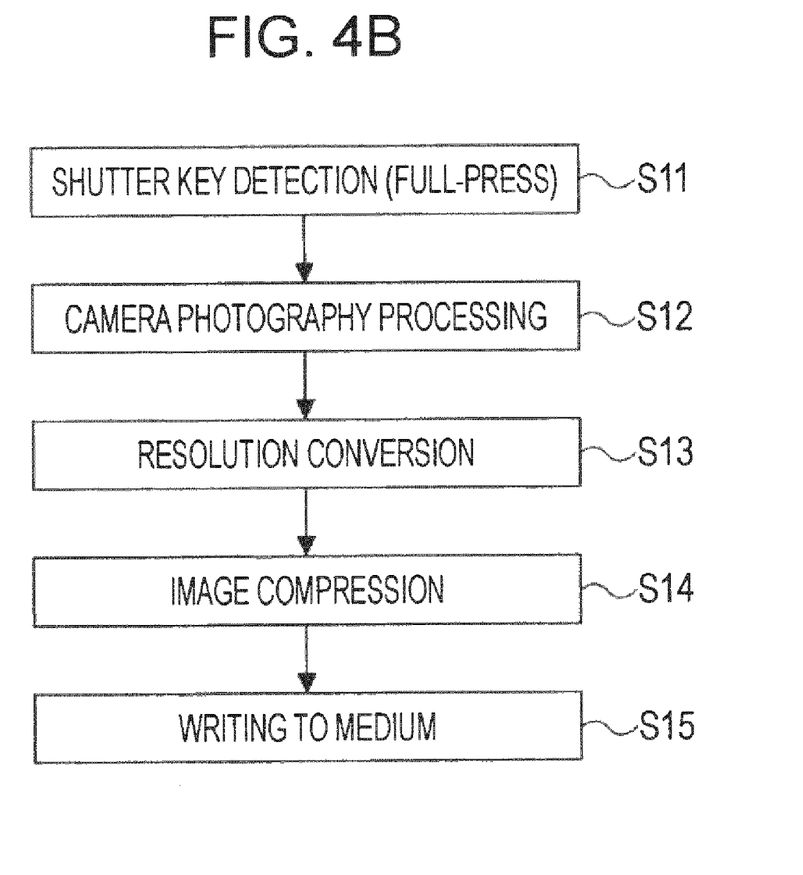
FIG. 4B is a flowchart showing a process of a capturing operation to be performed when the digital still camera captures an image.

FIG. 4A is a flowchart showing a process of a scanning operation to be performed in response to a half-press of the shutter key. FIG. 4B is a flowchart showing a process of a capturing operation to be performed in response to a full-press of the shutter key.

When the shutter key of the UI 28 is half-pressed, key information indicating the half-press of the shutter key is transmitted to the CPU 29 (step S1).

In response to the half-press of the shutter key, the CPU 29 instructs the AFE unit 12 and the camera DSP unit 16 to perform photographing processing. In addition, the CPU 29 causes the driver 10a to perform a scanning operation for a subject, such as control for adjusting a focus such that a subject image is converged by the optical system 10 and formed on the image capturing surface of the image capturing element 11 and control for adjusting an iris such that exposure appropriate for the subject is performed (step S2). Since the focus and iris control itself can adopt a technology of the related art, the description of the focus and iris control will be omitted here.

In contrast, in a state where a subject is displayed on the monitor display 25, when the user fully presses the shutter key of the UI 28 (step S11), the UI 28 performs key detection and transmits a signal of key information indicating the full-press of the shutter key to the CPU 29. In response to the full-press of the shutter key, the CPU 29 outputs a control signal to the driver 10a and performs photographing processing (step S12). In the processing of step S12, in accordance with a data flow similar to the data flow shown in FIG. 2, a camera image input from the optical system 10 is displayed on the monitor display 25.

When an instruction for photographing processing is issued via the driver 10a, information on a subject is converted into a digital signal through the optical system 10, the image capturing element 11, and the AFE unit 12, and the obtained digital signal is transmitted to the camera DSP unit 16, as described above. The camera DSP unit 16 performs image signal processing for correcting brightness, color, and the like, and converts the resolution of the image so as to have a size suitable for the photography mode (step S13). Then, the image codec processor 19 performs JPEG compression processing on the image (step S14), and the JPEG-compressed image is recorded on the recording medium 26 under the control of the medium controller 22 (step S15).

A case where the user performs two-stage operations including a half-press and a full-press of the shutter key has been described. In the case that the user (photographer) directly performs a full-press operation of the shutter key, a scanning operation including focus and iris control is performed as in the case that a half-press operation is performed, and then a capturing operation is performed.

A smile-detection automatic photography function of determining a photographing timing by utilizing recognition of a particular pattern, such as a smile, of an image of a subject can be applied to the digital still camera 1 according to this embodiment. Smile recognition can be attained when the CPU 29 executes a specific image recognition processing program or an engine for image recognition processing (not shown) is provided in the control unit 27.

When performing photographing processing, the digital still camera 1 may inform a subject of a photographing timing by external output from the UI 28, such as alarm sound or lighting or blinking of a lamp, using the output function of the UI 28.

In the case that a plurality of subjects exist in an image, the system side may automatically determine which subject is to serve as a target for smile detection. Alternatively, a target for smile detection may be determined in accordance with a manual operation by the user (photographer or the like).

In the case of performing photographing processing, it is necessary to adjust the focus and the iris to be suitable for a subject. With the smile-detection automatic photography function for recognizing a smile of a subject and performing a photographing operation, after a smile is detected, a scanning operation for causing the focus and the iris to follow the subject is performed and the photographing operation is then performed. That is, after the smile is detected, a period of time is necessary, the period of time being the same as that in the case of taking a single picture using the normal auto-focus function.

Although, in general, a human smile lasts only about 0.1 seconds, a scanning operation for focus and iris control takes at least about 0.2 seconds to about 0.3 seconds, which occupies most of the entire photographing time. Thus, even if a smile can be detected from a subject image, an actually captured face often does not have the smile on it, due to the delay caused by the scanning operation.

Thus, the digital still camera 1 according to this embodiment causes the focus and the iris to be fixed in advance. When a smile of a subject is detected from an image, a capturing operation is immediately started without starting a scanning operation again. That is, since the focus and the iris are fixed in advance, a time from about 0.2 seconds to about 0.3 seconds, which is necessary for a scanning operation to be performed between smile detection and a capturing operation, can be eliminated. Thus, the smile of the subject can be captured without fail.

More specifically, in the smile-detection photography mode, as in the process shown in FIG. 4A, a scanning operation including focus adjustment and iris control for a subject is performed in response to a half-press of the shutter key, and the focus and the iris are fixed. Then, in response to a full-press of the shutter key, smile-detection processing for the subject in the image is started, and a capturing operation waits until a smile is detected. When a smile is detected, a scanning operation is omitted and the capturing operation for recording a captured image is immediately performed.

Figure 5:
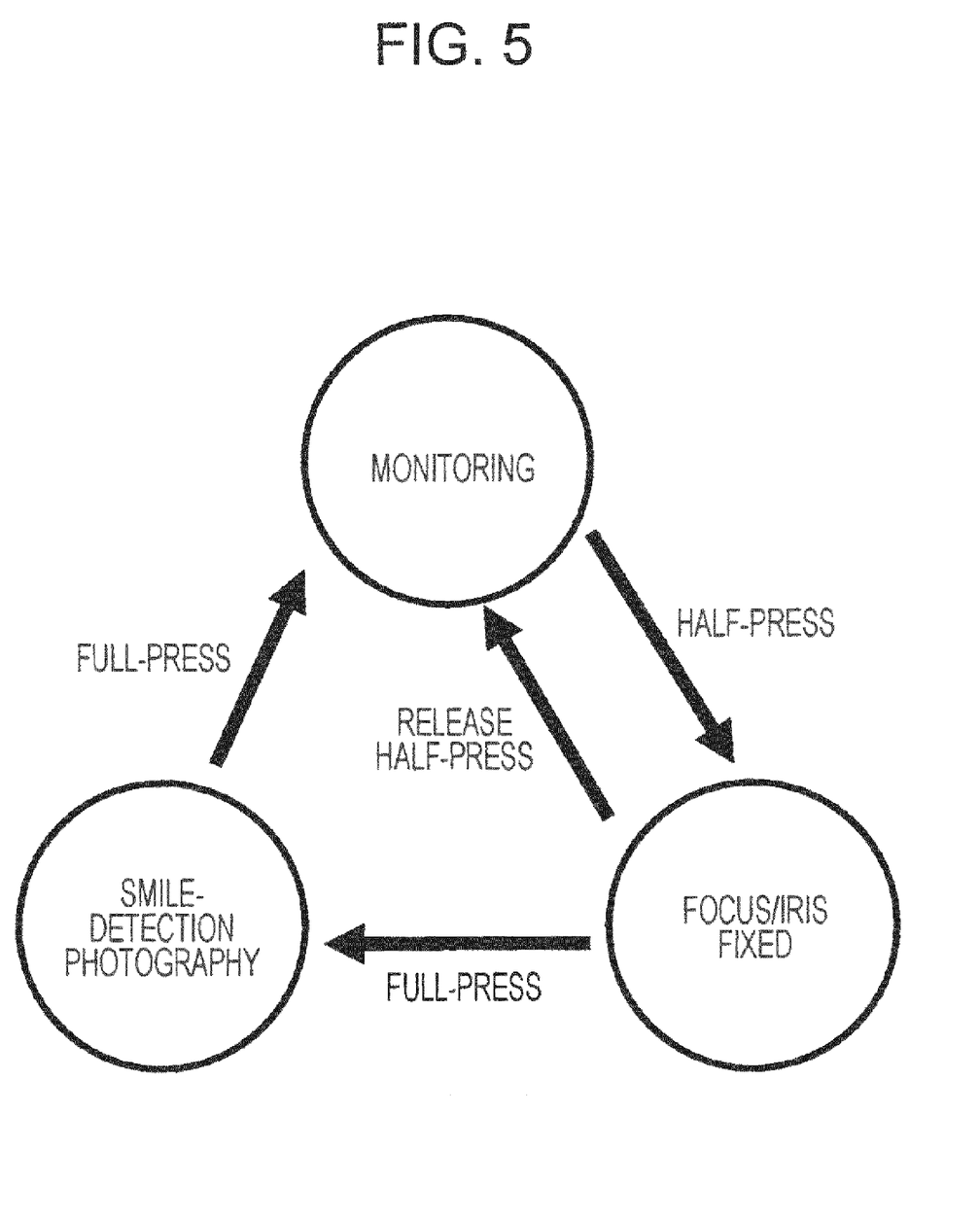
FIG. 5 is a state transition diagram of the digital still camera in a smile-detection photography mode.

FIG. 5 is a state transition diagram of the digital still camera 1 in the smile-detection photography mode. As shown in FIG. 5, in the smile-detection photography mode, three states, "monitoring", "focus/iris fixed", and "smile-detection photography", are provided.

In the monitoring state, the user (photographer) performs settings relating to a subject to be captured and the angle of view, using a camera image displayed on the monitor display 25, in accordance with the data flow shown in FIG. 2.

In the monitoring state, if the shutter key is half-pressed, focus and iris control for a subject in a camera image (that is, a scanning operation) is performed. Then, the focus/iris fixed state is entered, and the focus and iris are fixed.

In the focus/iris fixed state, if the shutter key is half-pressed again, the focus/iris fixed state is released, and the monitoring state is entered again.

In the focus/iris fixed state, if the shutter key is fully pressed, the smile-detection photography state is entered. In the smile-detection photography state, smile-detection processing, which will be described later, for the subject in the image is performed, while the focus and the iris are maintained fixed, and the digital still camera 1 stands ready to perform a capturing operation. Then, when a smile is detected, the capturing operation for recording a captured image is performed.

In the smile-detection photography state, basically, the focus and the iris are maintained fixed. During a period until the smile-detection photography state is released, a capturing operation is performed every time a smile of the subject is detected (that is, capturing operations are sequentially performed a desired number of times).

In addition, in the smile-detection photography state, if the shutter key is fully pressed again, the smile-detection photography state is released, and the monitoring state is entered again.

In the smile-detection photography state, instead of performing a capturing operation every time a smile of the subject is detected, only a single capturing operation may be performed when a smile of the subject is detected for the first time. However, digital still cameras do not involve the consumption of resources, such as films, for photographing. Thus, sequentially performing capturing operations in response to detection of smiles of the subject provides an advantage in that the user is able to easily select a best picture from among a plurality of captured images each containing a smile.

Figure 6:
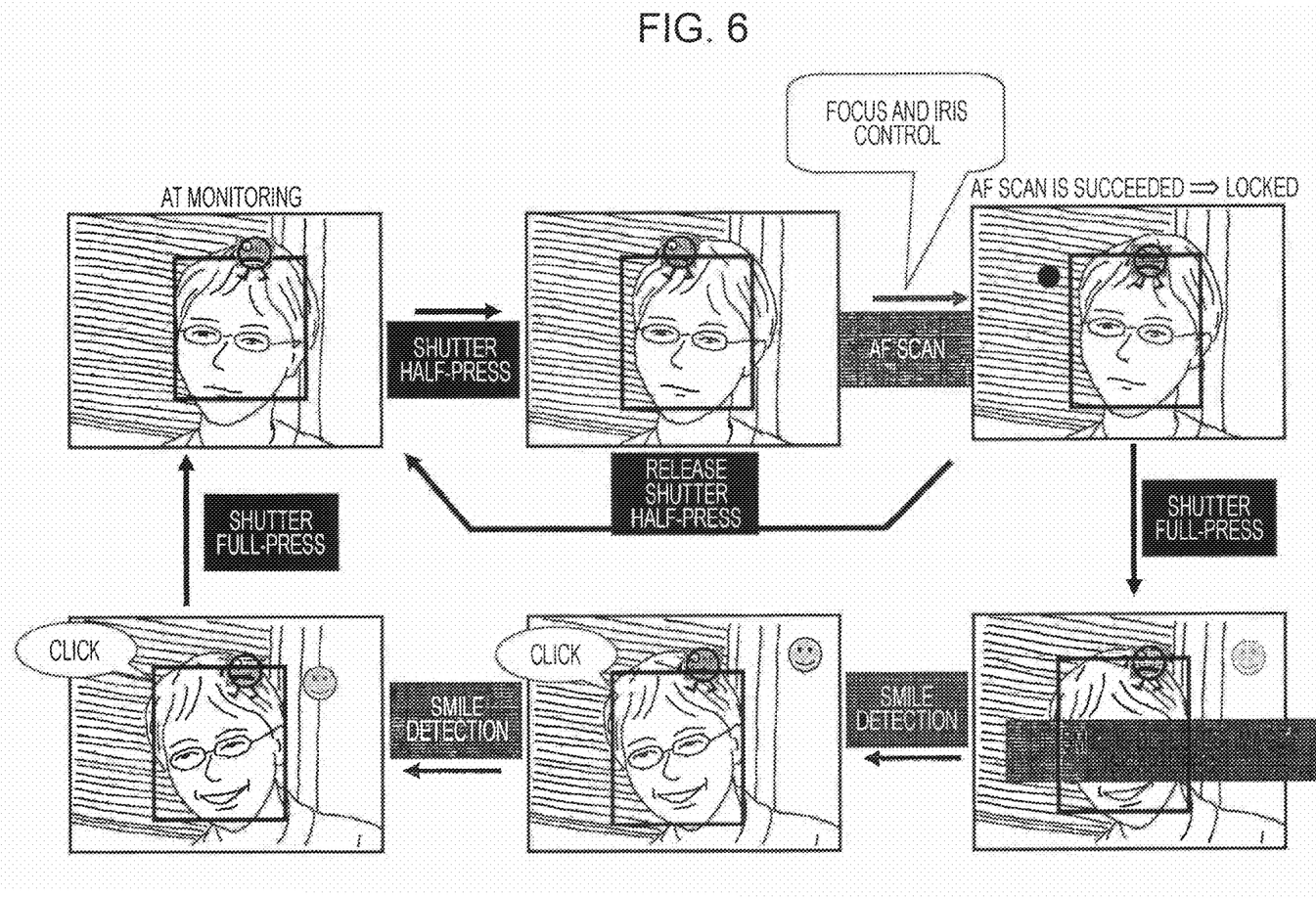
FIG. 6 illustrates an operation procedure to be performed in the smile-detection photography mode using screens displayed on the monitor display.

FIG. 6 illustrates an operation procedure to be performed in the smile-detection photography mode using display screens (through images) on the monitor display 25.

Camera images displayed on the monitor display 25 in accordance with the data flow shown in FIG. 2 are also transmitted to the control unit 27, and face detection processing is performed. A detection frame is displayed for a detected face of a subject. An icon indicating a main subject serving as a target for focus and iris control or a target for smile detection is displayed for the detection frame for the detected face of the main subject (see FIG. 12). In the example shown in part (a) of FIG. 6, only one subject exists. Thus, a detection frame and an icon are provided for the detected face of the subject.

In this state, in response to a half-press of the shutter key, focus and iris control (that is, a scanning operation) for the subject in the camera image is performed (part (b) of FIG. 6). After the scanning operation is successfully completed, the focus and the iris are fixed (part (c) of FIG. 6).

Then, in the state where the focus and the iris are fixed, in response to another half-press of the shutter key, the focus/iris fixed state is released, and the monitoring state is entered again (part (a) of FIG. 6).

In contrast, in the state where the focus and the iris are fixed, in response to a full-press of the shutter key, the smile-detection photography state is entered. Then, smile-detection processing, which will be described later, for the subject in the image is performed, while the focus and the iris are maintained fixed, and a capturing operation for recording a captured image is performed every time a smile is detected (parts (d) to (f) of FIG. 6). On the monitor screen, an icon indicating that a smile is being detected may be displayed.

Then, in the smile-detection photography state, in response to another full-press of the shutter key, the smile-detection photography state is released, and the monitoring state is entered again (part (a) of FIG. 6).

Figure 7:
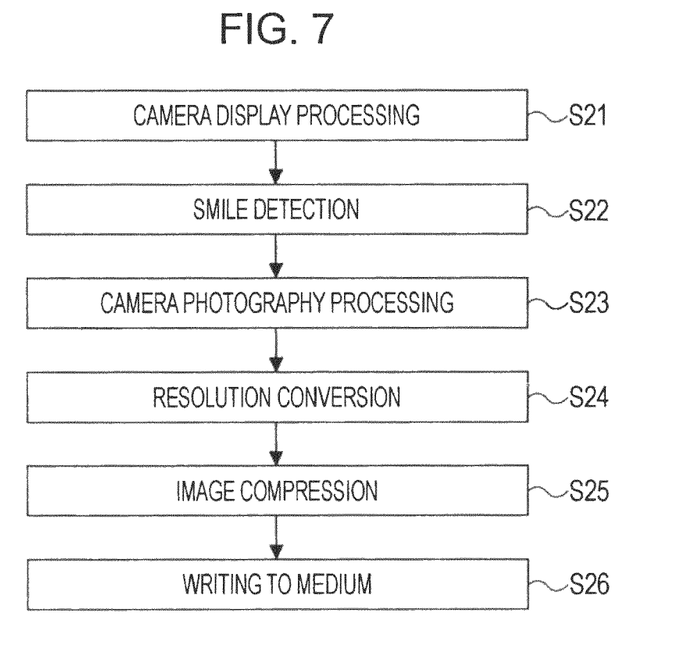
FIG. 7 is a flowchart showing a process to be performed when the digital still camera performs automatic photography in accordance with smile detection in a smile-detection photography state.

FIG. 7 is a flowchart showing a process to be performed when the digital still camera 1 performs automatic photography in accordance with smile detection in the smile-detection photography state in the state transition diagram shown in FIG. 5.

In accordance with a data flow similar to the data flow shown in FIG. 2, a camera image (through image) input from the optical system 10 is displayed on the monitor display 25 (step S21).

In the processing of step S21, the displayed image is also supplied to the control unit 27. At this point in time, the control unit 27 performs face detection for a subject in the image and selection of a detected face serving as a target for smile detection. For example, a face detection processing algorithm described in "Pikuseru Sabun Tokuchou wo Mochiita Jitsujikan Nin'i Shisei Kao Kenshutsuki no Gakushuu" (The 10th Image Sensing Symposium (SSII 2004)) can be used.

Then, the CPU 29 (or an image recognition engine (not shown)) that executes a specific image recognition processing program performs detection processing for a smile pattern of the subject designated on the screen (step S22). The description of the smile-detection processing will be described later.

Then, camera photography processing is started (step S23). More specifically, the CPU 29 issues an instruction for photographing processing using the driver 10a. Information on the subject is converted into a digital signal through the optical system 10, the image capturing element 11, and the AFE unit 12, and the obtained digital signal is transmitted to the camera DSP unit 16. The camera DSP unit 16 performs image signal processing for correcting brightness, color, and the like.

Since the focus and the iris are already fixed, a scanning operation, which occupies most of the entire photographing time, is omitted and the above-described camera photography processing is started.

Then, the resolution converter 18 converts the resolution of the image so as to have an image size suitable for the photography mode (step S24), and the image codec processor 19 performs JPEG compression processing on the image (step S25). Then, the JPEG-compressed image is recorded on the recording medium 26 under the control of the medium controller 22 (step S26).

For example, the face detection processing method described in "Pikuseru Sabun Tokuchou wo Mochiita Jitsujikan Nin'i Shisei Kao Kenshutsuki no Gakushuu" (The 10th Image Sensing Symposium (SSII 2004)) can be used for the smile-detection processing for a subject performed in step S22 of the flowchart shown in FIG. 7. Although the same processing algorithm can be used for smile-detection processing, as described above, a different image dictionary is used in this case. However, the gist of the present invention is not limited to particular face detection processing.

Figure 8:
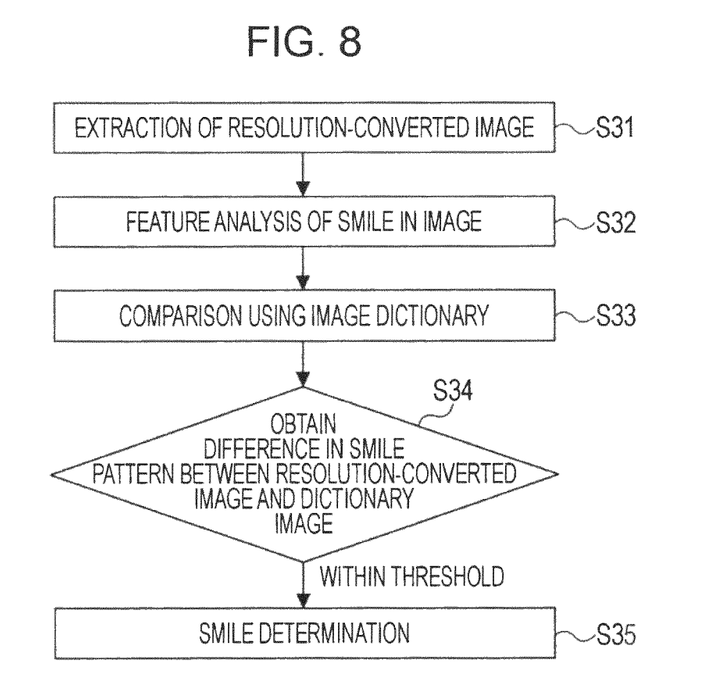
FIG. 8 is a flowchart showing a process of smile-detection processing for a subject to be performed in step S22.

FIG. 8 is a flowchart showing a process of the smile-detection processing for a subject to be performed in step S22.

An image whose resolution is converted by the resolution converter 18 so as to be suitable for the photography mode is acquired (step S31).

Then, feature analysis for a smile in the image is performed (step S32), and comparison is performed using an image dictionary (step S33).

A difference in smile pattern between the resolution-converted image and a dictionary image is obtained (step S34). When the difference falls within a predetermined threshold range, a value indicating that a smile is detected is transmitted (step S35).

As described above, in the digital still camera 1 according to this embodiment, in the smile-detection photography mode, the focus and the iris are maintained fixed. Thus, in response to detection of a smile of a subject in an image, a scanning operation, which occupies most of the entire photographing time, is omitted, and a capturing operation can be quickly performed without missing the smile.

However, such an automatic photography method is assumed to be performed in a state where a subject stands still. In a case where a subject may move, the subject may be captured in a position that is different from a position fixed in advance. Thus, focus adjustment for a captured image may not be performed accurately.

For example, referring to the state transition diagram shown in FIG. 5, in a case where the shutter key is fully pressed in the "focus/iris fixed" state to enter the "smile-detection photography" state and a detected face disappears due to movement of the subject or a smile of the subject is not detected for a long time, that is, in a case where smile-detection photographing is not performed quickly, it is supposed that the fixed focus and iris are not effective any more.

Thus, it is desirable that refreshing of the focus and the iris, that is, a rescanning operation, should be performed in an appropriate manner.

Figure 9:
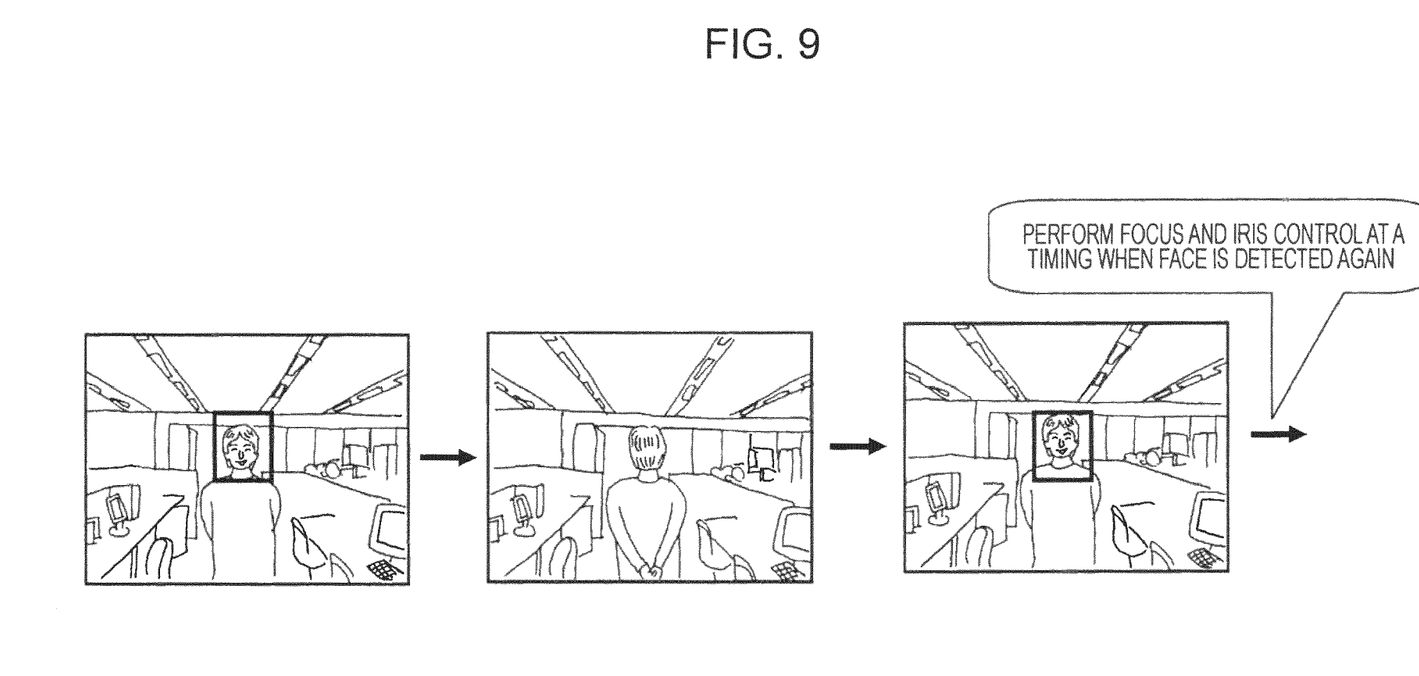
FIG. 9 illustrates that in the smile-detection photography state, a detected face serving as a target for smile detection disappears from an image, and when the subject is detected again, a rescanning operation is started.

For example, as shown in FIG. 9, in the smile-detection photography state, in the case that a detected face serving as a target for smile detection disappears from a captured image, when the subject is detected again, a rescanning operation is started and the focus and the iris are fixed again.

Figure 10:
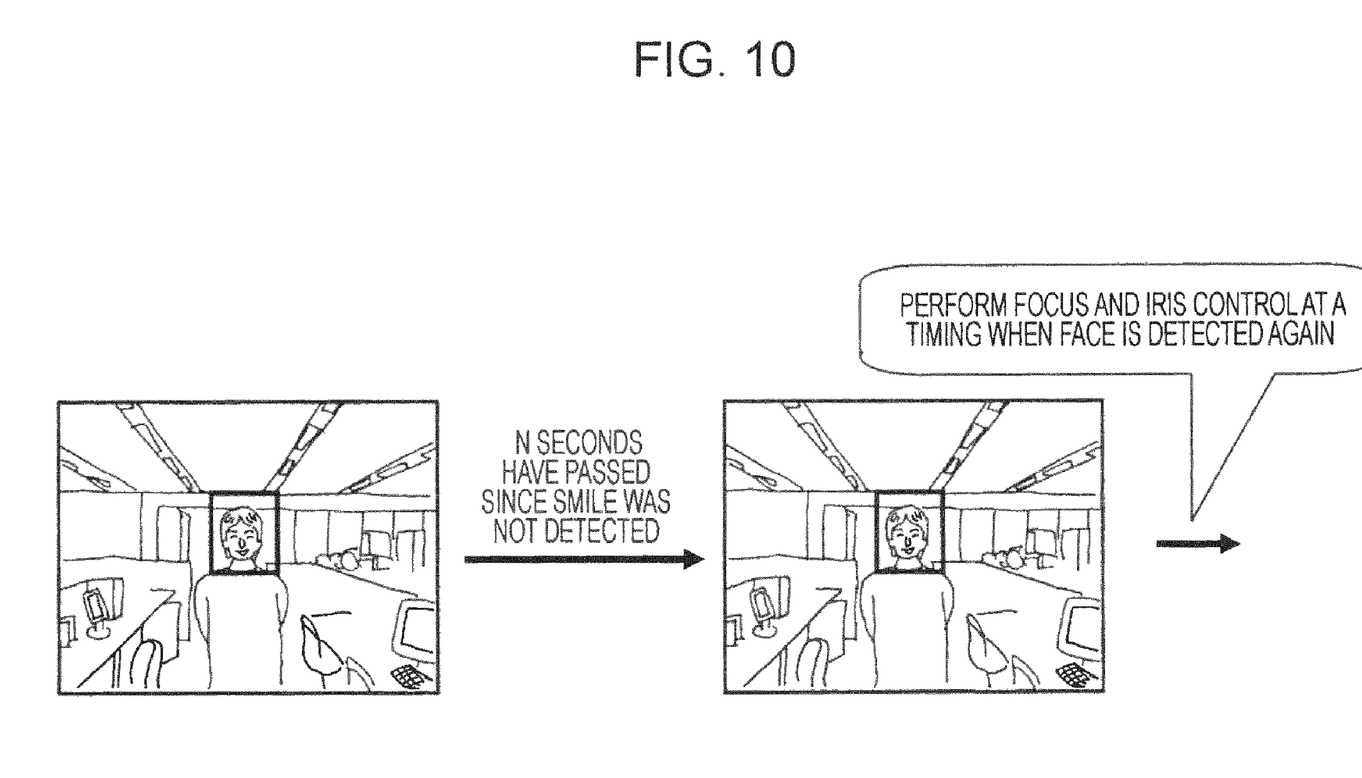
FIG. 10 illustrates that in the smile-detection photography state, in the case that a smile on a detected face serving as a target for smile detection is not detected from an image for a predetermined period of time or more, a rescanning operation is started.

In addition, as shown in FIG. 10, in the smile-detection photography state, in the case that a smile on a detected face serving as a target for smile detection is not detected from a captured image for a predetermined period of time or more, a rescanning operation is started and the focus and the iris are fixed again. Alternatively, in the smile-detection photography state, the focus and the iris may be refreshed periodically.

Figure 11:
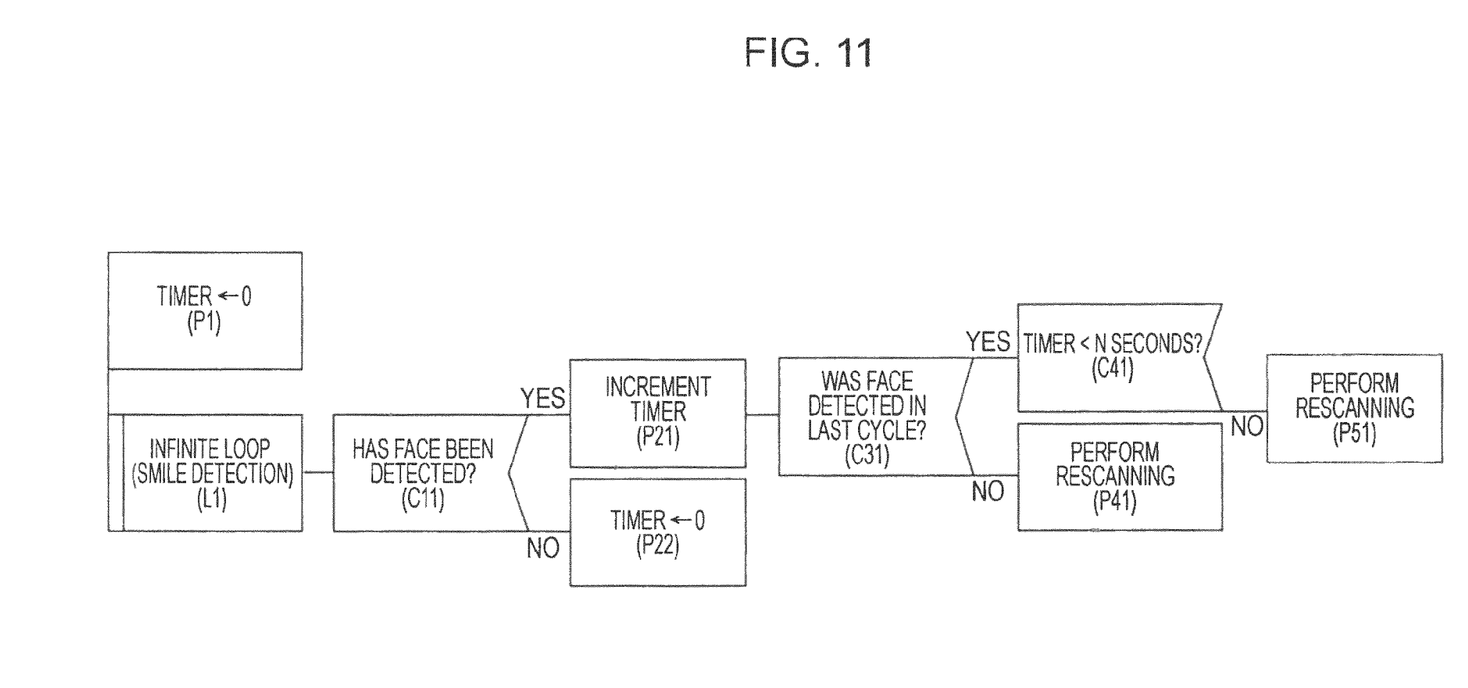
FIG. 11 illustrates a process to perform a rescanning operation in the smile-detection photography state in a problem analysis diagram (PAD) format.

FIG. 11 is a flowchart showing a process to perform a rescanning operation in the smile-detection photography state. The flowchart shown in FIG. 11 shows the configuration of an algorithm in accordance with a program chart notation that is called a problem analysis diagram (PAD) and is different from a Japanese Industrial Standard (JIS) flowchart. Essentially, an algorithm can be expressed as a composition of three basic units, connection, iteration, and selection. A PAD adopts a description method using such basic units of the three types.

The value of the timer is initialized to 0 (P1), and the smile-detection photography state is entered (L1).

In every predetermined control cycle, it is determined whether a detected face of a subject that is to serve as a target for smile detection has been detected from an image (C11). If a face has not been detected, the value of the timer is reset to 0 (P22).

If a face has been detected, the value of the timer is incremented by one (P21). Then, it is determined whether the face was detected in the last cycle (C31).

If the face of the subject was detected in the last cycle, it is determined whether the value of the timer is less than a predetermined value (C41). If the value of the timer exceeds the predetermined value (see FIG. 10), a rescanning operation for the focus and the iris is performed (P51).

If the face of the subject was not detected in the last cycle, that is, if the detected face serving as a target for smile detection disappears from an image and the subject is detected again (see FIG. 9), a rescanning operation for the focus and the iris is performed (P41).

It should be understood by those skilled in the art that various modifications, combinations, sub-combinations and alterations may occur depending on design requirements and other factors insofar as they are within the scope of the appended claims or the equivalents thereof.

What is claimed is:

1. An image photographing apparatus for capturing a subject image in accordance with smile detection of a subject, comprising:
    optical means for converging light from the subject;
    image capturing means for capturing the subject image obtained on the basis of the light from the subject converged by the optical means;
    optical mechanism driving control means for controlling driving of mechanisms of the optical means;
    image signal processing means for performing signal processing on the image captured by the image capturing means;
    image recording means for recording onto a predetermined recording medium the captured image on which the signal processing has been performed by the image signal processing means;
    face detection means for detecting a face of the subject from the captured image on which the signal processing has been performed by the image signal processing means;
    smile detection means for detecting a smile on the face detected by the face detection means; and
    smile-detection photography control means for performing photographing processing for the subject image in response to detection of the smile of the subject from the captured image, while the driving of the mechanisms of the optical means by the optical mechanism driving control means is maintained fixed.

2. The image photographing apparatus according to claim 1,
    wherein the optical mechanism driving control means performs at least one of control for adjusting a focus such that the subject image is converged by the optical means and formed on an image capturing surface of the image capturing means and control for adjusting an iris such that exposure appropriate for the subject is performed.

3. The image photographing apparatus according to claim 1, further comprising:
    a shutter key to be operated by a photographer, the shutter key relating to a photographing operation,
    wherein in response to a half-press of the shutter key, after causing the optical mechanism driving control means to control the driving of the mechanisms of the optical means, the smile-detection photography control means causes the driving of the mechanisms of the optical means to be fixed, and
    wherein in response to a full-press of the shutter key, the smile-detection photography control means stands ready for the photographing processing until a smile of the subject is detected from the captured image, while the driving of the mechanisms of the optical means by the optical mechanism driving control means is maintained fixed.

4. The image photographing apparatus according to claim 3,
    wherein every time a smile on the face of the subject is detected from the captured image, the smile-detection photography control means performs the photographing processing for the subject image while the driving of the mechanisms of the optical means by the optical mechanism driving control means is maintained fixed.

5. The image photographing apparatus according to claim 3,
    wherein in a fixed state where the driving of the mechanisms of the optical means by the optical mechanism driving control means is maintained fixed, in response to another half-press of the shutter key, the smile-detection photography control means releases the fixed state.

6. The image photographing apparatus according to claim 3,
    wherein in response to another full-press of the shutter key, the smile-detection photography control means releases a wait state where the smile-detection photography control means stands ready for the photographing processing until a smile of the subject is detected from the captured image while the driving of the mechanisms of the optical means by the optical mechanism driving control means is maintained fixed.

7. The image photographing apparatus according to claim 1,
    wherein in a wait state where the smile-detection photography control means stands ready for the photographing processing until a smile of the subject is detected from the captured image while the driving of the mechanisms of the optical means by the optical mechanism driving control means is maintained fixed, when the face detection means detects the face of the subject again after the face of the subject serving as a target for smile detection disappears from the captured image, the smile-detection photography control means causes the optical mechanism driving control means to control driving of the mechanisms of the optical means and causes the driving of the mechanisms of the optical means to be fixed again.

8. The image photographing apparatus according to claim 1,
    wherein in a wait state where the smile-detection photography control means stands ready for the photographing processing until a smile of the subject is detected from the captured image while the driving of the mechanisms of the optical means by the optical mechanism driving control means is maintained fixed, when a predetermined period of time has passed since a smile on the face of the subject serving as a target for smile detection was not detected, the smile-detection photography control means causes the optical mechanism driving control means to control driving of the mechanisms of the optical means and causes the driving of the mechanisms of the optical means to be fixed again.

9. An image photographing method for capturing a subject image, comprising the steps of:
    performing control for adjusting a focus such that the subject image is converged by an optical system and formed on an image capturing surface and control for adjusting an iris such that exposure appropriate for a subject is performed;

fixing the control for the focus and the control for the iris;
detecting a face of the subject from a captured image; and
performing, in response to detection of a smile of the subject from the captured image, a capturing operation for recording the captured image onto a predetermined recording medium, while the control for the focus and the control for the iris are maintained fixed.

10. The image photographing method according to claim 9,
wherein an operation relating to a photographing operation is input from a photographer using a shutter key,
wherein in response to a half-press of the shutter key, after the control for adjusting the focus and the control for adjusting the iris are performed, the control for the focus and the control for the iris are fixed and a state where the control for the focus and the control for the iris are fixed is maintained as long as a state where the shutter key is half-pressed lasts, and
wherein in response to a full-press of the shutter key, the capturing operation waits until a smile of the subject is detected from the captured image, while the control for the focus and the control for the iris are maintained fixed.

11. The image photographing method according to claim 10,
wherein every time a smile on the face of the subject is detected from the captured image, the capturing operation is performed.

12. The image photographing method according to claim 10,
wherein in a fixed state where the control for the focus and the control for the iris are maintained fixed, in response to release of the half-press of the shutter key, the fixed state is released.

13. The image photographing method according to claim 10,
wherein in response to another full-press of the shutter key, a wait state where the capturing operation waits until a smile of the subject is detected from the captured image while the control for the focus and the control for the iris are maintained fixed is released.

14. The image photographing method according to claim 9,
wherein in a wait state where the capturing operation waits until a smile of the subject is detected from the captured image while the control for the focus and the control for the iris are maintained fixed, when the face of the subject is detected again after the face of the subject serving as a target for smile detection disappears from the captured image, control for adjusting the focus and control for adjusting the iris are performed again and the control for the focus and the control for the iris are fixed again.

15. The image photographing method according to claim 9,
wherein in a wait state where the capturing operation waits until a smile of the subject is detected from the captured image while the control for the focus and the control for the iris are maintained fixed, when a predetermined period of time has passed since a smile on the face of the subject serving as a target for smile detection was not detected, control for adjusting the focus and control for adjusting the iris are performed again and the control for the focus and the control for the iris are fixed again.

16. A non-transitory computer readable medium having computer readable instructions that when executed on a computer perform image photographing processing when capturing a subject, comprising the steps of:
performing control for adjusting a focus such that the subject image is converged by an optical system and formed on an image capturing surface and control for adjusting an iris such that exposure appropriate for a subject is performed;
fixing the control for the focus and the control for the iris;
detecting a face of the subject from a captured image; and
performing, in response to detection of a smile of the subject from the captured image, a capturing operation for recording the captured image onto a predetermined recording medium, while the control for the focus and the control for the iris are maintained fixed.

17. An image photographing apparatus for capturing a subject image in accordance with smile detection of a subject, comprising:
an optical unit configured to converge light from the subject;
an image capturing unit configured to capture the subject image obtained on the basis of the light from the subject converged by the optical unit;
an optical mechanism driving control unit configured to control driving of mechanisms of the optical unit;
an image signal processing unit configured to perform signal processing on the image captured by the image capturing unit;
an image recording unit configured to record onto a predetermined recording medium the captured image on which the signal processing has been performed by the image signal processing unit;
a face detection unit configured to detect a face of the subject from the captured image on which the signal processing has been performed by the image signal processing unit;
a smile detection unit configured to detect a smile on the face detected by the face detection unit; and
a smile-detection photography control unit configured to perform photographing processing for the subject image in response to detection of the smile of the subject from the captured image, while the driving of the mechanisms of the optical unit by the optical mechanism driving control unit is maintained fixed.

* * * * *